Figure 1:
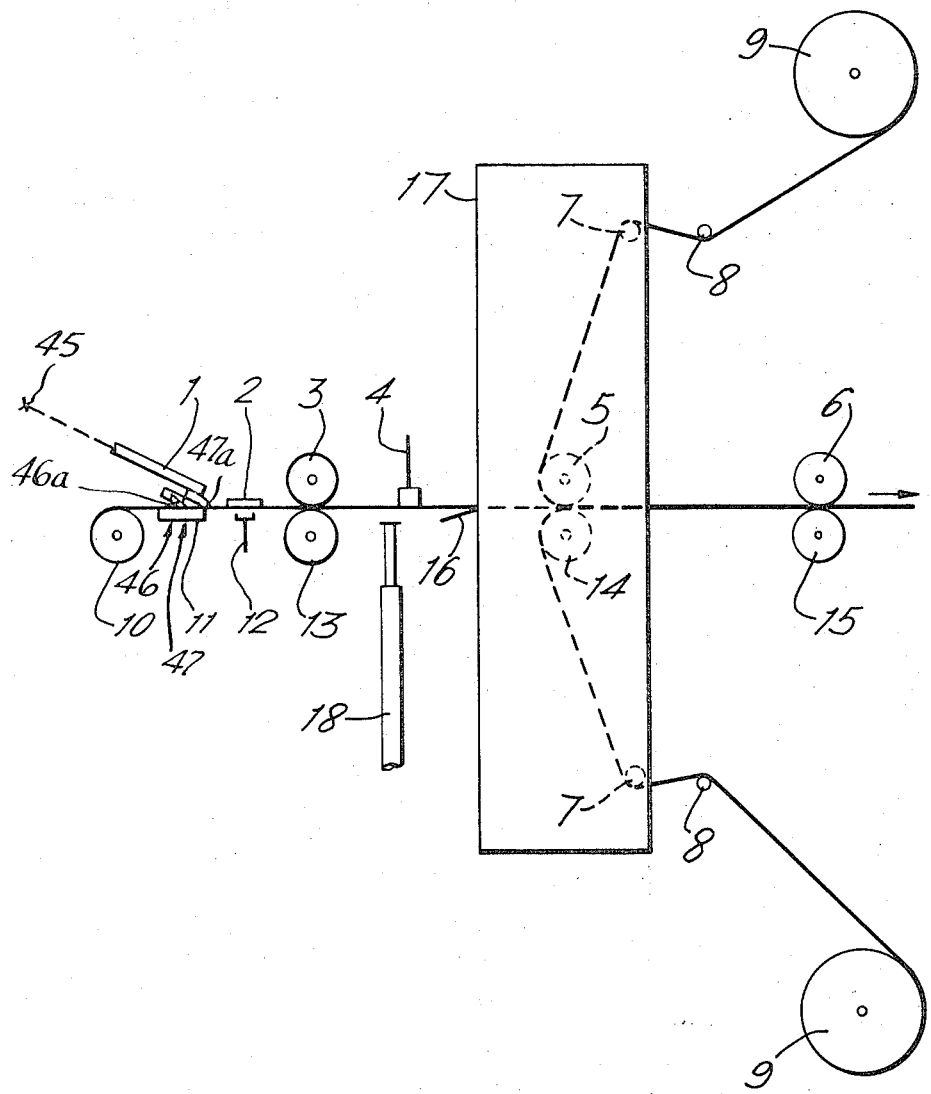

United States Patent
Heibye et al.

[11] 3,810,304
[45] May 14, 1974

[54] METHOD OF PRODUCING THIN, FLEXIBLE HEATING ELEMENTS

[76] Inventors: Paulus Heibye; Rolf Heibye, both of Annerudjordet 43, 1370-Asker, Norway

[22] Filed: Oct. 3, 1969

[21] Appl. No.: 863,555

[30] Foreign Application Priority Data
Oct. 7, 1968  Norway.............................. 3958/68

[52] U.S. Cl....................... 29/611, 156/47, 156/52
[51] Int. Cl. .............................................. H05b 3/00
[58] Field of Search ...... 29/611, 610; 338/288, 289, 338/293, 212, 283, 280; 83/332, 37, 346, 78; 156/47, 51, 55, 56, 52, 322; 219/542, 543, 549, 528, 553, 383

[56] References Cited
UNITED STATES PATENTS
| | | | |
|---|---|---|---|
| 2,361,374 | 10/1944 | Abbott............................. | 156/55 X |
| 2,680,184 | 6/1954 | Cox................................. | 219/383 X |
| 3,168,617 | 2/1965 | Richter............................ | 156/47 X |
| 3,239,396 | 3/1966 | Bohannon, Jr................... | 156/52 |
| 3,263,307 | 8/1966 | Lund et al. ..................... | 29/611 |
| 3,408,735 | 11/1968 | Eisler................................ | 29/610 |
| 3,481,802 | 12/1969 | Marcell............................. | 156/52 |
| 3,513,045 | 5/1970 | Emmel et al..................... | 156/55 |

FOREIGN PATENTS OR APPLICATIONS
| | | | |
|---|---|---|---|
| 914,140 | 6/1954 | Germany ......................... | 156/56 |

*Primary Examiner*—Charles W. Lanham
*Assistant Examiner*—Victor A. DiPalma
*Attorney, Agent, or Firm*—Larson, Taylor and Hinds

[57] ABSTRACT

A method for producing thin flexible heating elements comprising a resistance foil inserted between plastic sheets. A pair of plastic sheets are fed between a pair of welding rollers with a web of resistance foil fed therebetween. A heating chamber encloses the welding rollers and a portion of the plastic sheets upstream of the welding rollers and air is circulated through this chamber to pre-heat the plastic sheets to approximately welding temperature before the sheets reach the welding rollers.

7 Claims, 2 Drawing Figures

METHOD OF PRODUCING THIN, FLEXIBLE HEATING ELEMENTS

The present invention relates to a method for the production of thin, flexible heating elements of uniform gauge and breadth comprising a resistance foil inserted between insulating plastic sheetings and having portions removed in such a manner that the metal foil is meander shaped when transversally cut, said method involving continuous intermittent feed.

Heat elements of the mentioned kind are used for room heating. For this purpose the heating elements are made with a large surface and for low temperature and are secured in the room defining walls, preferably in the ceiling.

From the U.S. Pat. No. 3,020,378 and also U.S. Pat. No. 3,263,307 a method is known according to which thin, meander shaped resistance bodies are produced in an intermittent or continuous process and during the same process may be covered by plastic sheeting on both sides. A similar method is known from the Norwegian Pat. No. 109,918.

According to the last mentioned patent the plastic sheeting is welded by being fed between stationary welding dies. This method has the disadvantage that the plastic material has to be extensively stretched, which is not practicable without some deformation of the plastic taking place and resulting in a finished element which is not quite plane and thus will not achieve the desired uniform contact with its support. It is, however, most important that heating elements of this kind are arranged in the best possible contact with e.g. the upper surface of the ceiling, since heat insulating air pockets will occur between the heating elements and the ceiling if the heating elements are buckled.

If the plastic material has not been most suitably stocked prior to its utilization, e.g. moisture absorbed by the plastic can make the welding problematic. Furthermore, the welding velocity is highly limited in such a process if a satisfactory product is to be achieved. Also, a most uniform velocity is necessary to avoid variable heating of the sheeting. To achieve an increased welding velocity in connection with the mentioned design it might be suitable to let the welding dies have a higher temperature than the plastic material can resist over a longer period. In case of interruption of operation the dies thus have to be removed from the sheeting or vice versa to avoid overheating of the sheeting. This is a complicating factor involving some danger of damage as well. Additionally, said method of welding involves considerable pressure between the dies. Said pressure may under unfortunate circumstances result in damages of the web of resistance foil.

The mentioned welding method, furthermore, necessitates the use of an easily weldable plastic laminate having a low melting point, as it is not suitable to let the sheeting shrink more than about 0.83 percent in the transversal dimension.

Heating elements can have a permissible over temperature of 60°C. At room temperature, e.g. 24°C, this indicates a total temperature of 84°C of the elements. The insulating sheeting generally used today consists of a polyester film coated by a film of polyethylene as a welding material. The polyethylene has a melting point of approximately 120°C. It is technically more suitable to use a polyethylene (or other plastic material) having a considerably higher melting point, so as to achieve an element the permissible operation temperature of which is not so close to the melting point of e.g. the polyethylene used. This is, however, not practicable according to the specification of the Norwegian Pat. No. 109,918, inter alia since the welding at high temperatures due to the resulting considerable creeping of the polyester necessitates that the polyester be substantially through with shrinking before the insulating sheeting is fed into the welding device.

From the Norwegian Pat. No. 109,918 slitting means are known for providing two sets of longitudinal slits, each of which is periodically interrupted for short distances positioned approximately in the middle of the longitudinal slit dimension of the other set. Said slitting method involves turning every second element around after production in order to have all elements equally oriented which is necessary to provide for a rational subsequent treatment of the elements.

An object of the present invention is to avoid the above mentioned disadvantages and to provide a method for the production of heating elements which to a large extent are secured against deformation, said method permitting a considerably increased welding velocity and welding pressure as well as rendering it possible to weld materials having a considerably higher melting point than those previously used.

The development of this new welding process met with considerable difficulties and these problems gave rise to an extensive research. To elucidate this fact, it is observed that a simple plastic film has a gauge of only approx. 0.045 mm and generally a breadth of approx. 600 mm. According to the present invention, if desired, a shrinkage of 3.3 percent or somewhat more in the cross direction of the film is permissible without resulting in a difficult or unsuitable production process. Due to the fact that the plastic sheeting is provided with heat for a comparatively long time, extensive shrinkage can take place without use of extremely high temperatures which might damage the plastic sheeting as well as the tin foil used as a resistance material.

If the plastic sheeting and the resistance foil adhere correctly the elements will obtain the most attractive appearance. To achieve this we previously operated with a shrinkage of approx. 1.6 percent in the cross direction of the plastic sheeting.

According to the invention a method of the above mentioned nature is suggested, which method is characterized in that at least one preliminary slit resistance foil is introduced into a heating chamber and fed between welding rollers arranged and heated in said chamber, provided with plastic sheeting which prior to the joining operation is heated to or approximately to the welding temperature by surrounding hot air.

The sheeting having substantially shrunk before welding takes place, it is possible to achieve that the strips of resistance foil are not deformed but maintain their correct breadth in spite of extensive shrinkage of the plastic material.

According to another feature of the invention the knives are raised from the web as a unit at the defining area between two elements and thereupon lowered again. The slits are thus interrupted for a certain distance, whereupon the web is provided with at least one supporting web and cut transversally in such a manner that the cut touches or cuts every second slit, alternately of one or the other heating element positioned on each side of the cut, meander shaped resitance bodies thus being provided and leaving the cutting device with equal orientation.

This slitting method permits the production of heating elements of any desired length, necessitating no adjustment of the device for each type of elements but a preliminary adjustment of a continuously running counting apparatus recording the treated distance and controlling the length of intervals between each raising of the tilting lever. As will appear from FIG. 2, the heating elements produced according to the invention always have the same orientation.

For a further elucidation of the invention an embodiment will now be described with reference to the drawing, wherein FIG. 1 shows a diagrammatic side view of a device for carrying out the method according to the invention.

Figure 2:
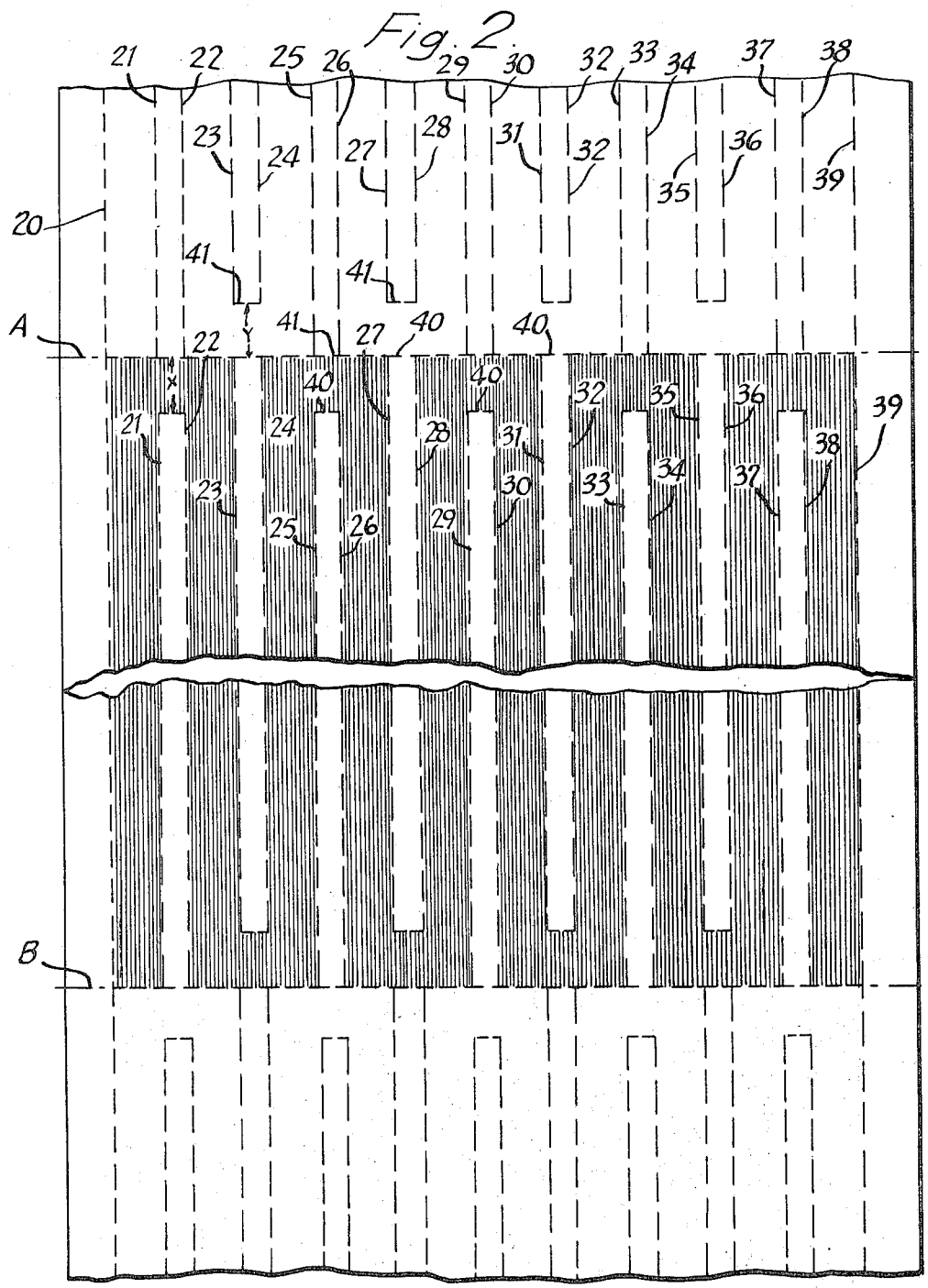

FIG. 2 shows a diagrammatical embodiment of the slitting process according to the invention.

From the magazine roll 10 one or several parallel resistance foils run between a block 11 and the cutting means 1. The cutting means mainly comprises a tilting lever with tilted knives mutually spaced in accordance with the breadth of the slits and the breadth of the meander shaped foil strips respectively. The block 11 is provided with grooves disposed so as to permit the knives to enter them when the tilting lever is lowered. The block 11 may be produced of rigid foamed plastic and, thus, the grooves may be provided by forcing the set of knives into the foamed plastic block, which provides for an especially simple and economic production of the slitting means.

While slitting means are known which include the concept of having two rows of blades staggered from each other, and hence while this basic concept of two staggered rows of blades forms no part of the present invention, there is provided according to the present invention, a new and improved method and apparatus for mounting and operating such staggered blades. The slitting means comprises a support 1 rotatable about an axis 45 and containing two transversely extending rows 46 and 47 of knives spaced apart in the direction of travel. One knife 46a of row 46 and one knife 47a of the other row 47 are visible in FIG. 1. Referring to FIG. 2, the knives of row 46 are spaced apart transversely so as to cut slits 21, 22, 25, 26, 29, 30, 33, 34, 37 and 38 while the knives of row 47 are spaced transversely to cut slits 23, 24, 27, 28, 31, 32, 35, and 36. Thus, by lifting support 1 the interruptions X and Y are simultaneously created. Two exterior knives cut slits 20 and 39 continuously, whether the support 1 is raised or lowered while transverse slits such as A and B are made at regular intervals. For defining the ends of the slitted strips, a stamp 4 is arranged to cut the foremost end 40 of the strips and a stamp 12 is arranged to cut the trailing end 41 of the strips. The result is a series of meander-shaped foil strips such as that shown in the shaded area of FIG. 2 between lines A, B, 20 and 39.

The foil is directed between rollers 3 and 13 and in connection with the stamp 4 a suction orifice is arranged to suck off the tin foil strips to be removed, apart from the lateral clean cut strips which simply fall down. The cutting can also be removed from the foil web by cutting or melting.

The knives used for slitting the resistance foil have a very simple and reliable construction. Also the slitting pattern according to the invention permits the production of heating elements of an arbitrary length and equal orientation in one and the same machine by a simple adjustment which makes the slitting process very flexible and simplifies the introduction of automatic control. The resistance foil can run tightly between the rollers for all positions of the tilting lever and the knives and, thus, no tension roller is needed in this connection.

When the slitting of an element is to be started, the tilting lever is lowered and when the slitting has been effected in the desired length, the tilting lever is raised so that the slitting operation is suspended while the foil is advanced with the desired speed. At the end of the adjusted interruption of the slitting operation the tilting lever is again lowered and a new heating element is slitted. The interruption of the slitting operation thus results in foil portions remating alternately in two rows, as shown in FIG. 2. In this way a defining area between two heating elements is provided where cross cutting of the foil such as along lines A, B results in the meander shape, an embodiment of which is diagrammatically shown in shaded lines in FIG. 2. Preferably the length of the remaining portions corresponds to the distance between the cutting knife portions of the knife sets.

The slitted foil web is fed into a large heating chamber 17, wherein a pair of welding rolls 5 and 14 is arranged. Air heated to the desired welding temperature, e.g. in the order of 125°–155°C, is circulated within the chamber. The welding rolls are heated by the air. Thus a most uniform roll temperature is achieved. For the circulation of air a suction outlet is preferably provided, so that the vapors from the plastic are removed and the air in the heating chamber and the working space is purified. It is most important that the rolls be heated evenly to avoid deformation resulting in diameter variations in the metal rolls along their longitudinal dimension. Such a deformation would cause different areas of the plastic sheeting to be advanced with different speed, resulting in folded plastic sheeting and a product unfit for use. To eliminate temperature gradients in the rolls the roll bearings may also be arranged within the heating chamber. From the magazine rolls 9 a laminated plastic sheeting is fed via guiding rolls or tubes 8 and 7 partly around the welding rolls 5 and 14 in order to coat both faces of the resistance foil.

Due to the fact that the plastic sheetings are fed a certain distance within the heating chamber they will be heated to or approximately to welding temperature before being combined between the welding rolls. In order to achieve a rapid heating of the plastic sheetings to welding temperature and to bring about a rapid loss of moisture as well as the necessary shrinkage, the guide means 7 may be designed as e.g. brass tubes having build in heating elements. To prevent overheating of the plastic sheeting in connection with a possible interruption of operation means may be provided to keep the plastic sheetings at a certain distance from the heating tubes 7 in case of an interruption of operation when extremely high temperatures are utilized. Said means is e.g. a magnet controlled yoke which is activated in case of interruption of operation. It is most important that the plastic sheetings be heated to welding temperature before they reach the welding rolls so as to avoid any cooling of the roll portions first engaging the plastic sheetings. Preliminary heating of the sheetings e.g. by the aid of the heating tubes 7 renders it possible to increase the production velocity. One of the welding rolls is for instance rubber coated so as to ensure a uniform pressure between the welding rolls and absorb any roughness of the material. Rubber is a suitable material despite its bad heat conducting qualities, since the plastic sheetings do not need heat from the welding rolls.

The web of sheetings can be advanced by the rolls 5, 14 as well as by the rolls 6, 15.

The sheetings suitably consist of laminates having one easily welded surface.

Upon cross cutting the front and back edges of the heating element can be protected by adhesive tape or the like and connecting wires etc. can be arranged under said tape or the like.

Although it has been stated that air is circulated in the heating chamber, it is obvious that other gasses or gas mixtures can be used.

We claim:

1. A method for the production of thin, flexible heating elements of uniform gauge and breadth and comprising a resistance foil inserted between insulating plastic sheets, said method comprising the steps of feeding at least one resistance foil web into an enclosed heating chamber and between welding rolls also arranged completely in said chamber, providing a pair of plastic sheets each having at least one weldable layer into said enclosed chamber and then between said welding rolls for welding the resistance foil therebetween adjacent the weldable layer of each sheet, and heating the air within the chamber to approximately the welding temperature of said weldable layer to heat the welding rollers to approximately said welding temperature and also to heat the plastic sheets to approximately said welding temperature before they reach the welding rolls for the welding operation.

2. A method according to claim 1, characterized in that the plastic sheetings are heated in the heating chamber partly by being brought into contact with heating tubes or the like.

3. A method according to claim 1, wherein the chamber is heated by circulating hot air therethrough.

4. A method according to claim 1, wherein each sheet is formed of two layers including said weldable layer and a second layer on the side of the welding layer away from the other sheet, which other layer is not weldable at the said welding temperature.

5. A method according to claim 4, wherein the weldable layer is polyethylene and the other layer is polyester.

6. A method according to claim 5, including heating the chamber to a temperature in the order of 125°–155°C.

7. A method according to claim 1, including cutting rows of resistance foil from a foil web which is moved in relation to a number of mutually connected knives, which knives are arranged alternately in two rows across the web so as to form parallel, longitudinal slits arranged in alternately displaced relation in the longitudinal direction, all of said knives of both rows being connected to a common support which is movable about a common axis, said cutting including the steps of raising all of the knives simultaneously as a unit at the defining areas between two elements and thereafter lowering all of the knives again simultaneously after a predetermined interruption over a certain longitudinal distance, whereupon the foil web is provided with at least one supporting web and is cut transversely in such a manner that the cut touches or cuts every second slit for alternately one and the other heating element, positioned on each side of the cut, thus providing a meander shaped resistance element which leaves the cutting device with equal orientation.

* * * * *